United States Patent
Goleski et al.

(10) Patent No.: US 9,194,482 B2
(45) Date of Patent: Nov. 24, 2015

(54) SYSTEM FOR SUPPLYING FLUID TO TRANSMISSION CONTROL ELEMENTS

(71) Applicant: FORD GLOBAL TECHNOLOGIES, LLC, Dearborn, MI (US)

(72) Inventors: Gregory D. Goleski, Rochester Hills, MI (US); Steven G. Thomas, Bloomfield Hills, MI (US); Jeffrey E. Maurer, Commerce, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 461 days.

(21) Appl. No.: 13/633,282

(22) Filed: Oct. 2, 2012

(65) Prior Publication Data

US 2014/0090944 A1 Apr. 3, 2014

(51) Int. Cl.

| | |
|---|---|
| *F16D 25/10* | (2006.01) |
| *F16H 3/66* | (2006.01) |
| *F16H 57/04* | (2010.01) |
| *F16H 63/30* | (2006.01) |
| *F16D 25/0638* | (2006.01) |
| *F16D 48/02* | (2006.01) |
| *F16H 3/44* | (2006.01) |
| *F16H 57/08* | (2006.01) |

(52) U.S. Cl.
CPC .......... *F16H 57/043* (2013.01); *F16D 25/0638* (2013.01); *F16D 25/10* (2013.01); *F16D 48/0206* (2013.01); *F16H 57/0473* (2013.01); *F16H 57/0484* (2013.01); *F16H 63/3026* (2013.01); *F16D 2048/0224* (2013.01); *F16H 3/66* (2013.01); *F16H 2003/447* (2013.01); *F16H 2057/087* (2013.01); *F16H 2200/2012* (2013.01); *F16H 2200/2046* (2013.01)

(58) Field of Classification Search
CPC ............ F16H 63/3026; F16H 57/0473; F16H 57/043; F16H 2057/087; F16D 25/10; F16D 2048/0224
USPC ............ 192/48.609, 48.611, 48, 614, 48.618, 192/48.619, 85.25, 3.25, 3.3
See application file for complete search history.

(56) References Cited

U.S. PATENT DOCUMENTS

| | | | | |
|---|---|---|---|---|
| 3,053,115 | A * | 9/1962 | Cartwright et al. | 475/159 |
| 3,730,022 | A * | 5/1973 | O'Malley | 475/146 |
| 4,449,422 | A * | 5/1984 | Fuehrer et al. | 74/606 R |
| 2009/0247343 | A1 * | 10/2009 | Hart et al. | 475/31 |

* cited by examiner

*Primary Examiner* — Colby M Hansen
(74) *Attorney, Agent, or Firm* — James Dottavio; MacMillan, Sobanski & Todd, LLC

(57) ABSTRACT

A system for supplying fluid to transmission control elements includes a body producing clutch-apply pressures and a lube source, clutches, each clutch including a servo and a balance volume, a shaft including passages, a support including paths communicating each of the clutch-apply pressures and the lube source to a respective passage, and a clutch hub communicating clutch-apply pressure from each of the passages to a respective servo, and communicating the lube source to the balance volumes.

18 Claims, 6 Drawing Sheets

SYSTEM FOR SUPPLYING FLUID TO TRANSMISSION CONTROL ELEMENTS

BACKGROUND OF THE INVENTION

1. Field of the Invention

This invention relates generally to an apparatus for supplying fluid to clutch and brake control elements of an automatic transmission and to a transmission lube circuit.

2. Description of the Prior Art

An automatic transmission for a motor vehicle capable of producing a large number of forward gear ratios may require several brakes and four or more clutches to control its operation. In addition such a transmission may require two or three passages of oil feed to its torque converter.

A need exists in the industry for a technique that feeds automatic transmission fluid (ATF) to the torque converter, clutches, brakes and a lube circuit through a front support assembly such that the axial length of the transmission is minimized. The ATF must be supplied to a separate oil path for each clutch-apply circuit, the lube circuit and each of the torque converter circuits while providing sealing between the paths, adequate flow area, and connections from a hydraulic control body through the pump support.

SUMMARY OF THE INVENTION

A system for supplying fluid to transmission control elements includes a body producing clutch-apply pressures and a lube source, clutches, each clutch including a servo and a balance volume, a shaft including passages, a support including paths communicating each of the clutch-apply pressures and the lube source to a respective passage, and a clutch hub communicating clutch-apply pressure from each of the passages to a respective servo, and communicating the lube source to the balance volumes.

In conventional automatic transmissions having multiple rotating clutches and a three-passage torque converter, an extra support structure in the center of the trans (called a center support) is required to allow passage of one or more of the rotating clutches. This system provides feeds for all the clutches and the lube circuit without adding a center support.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
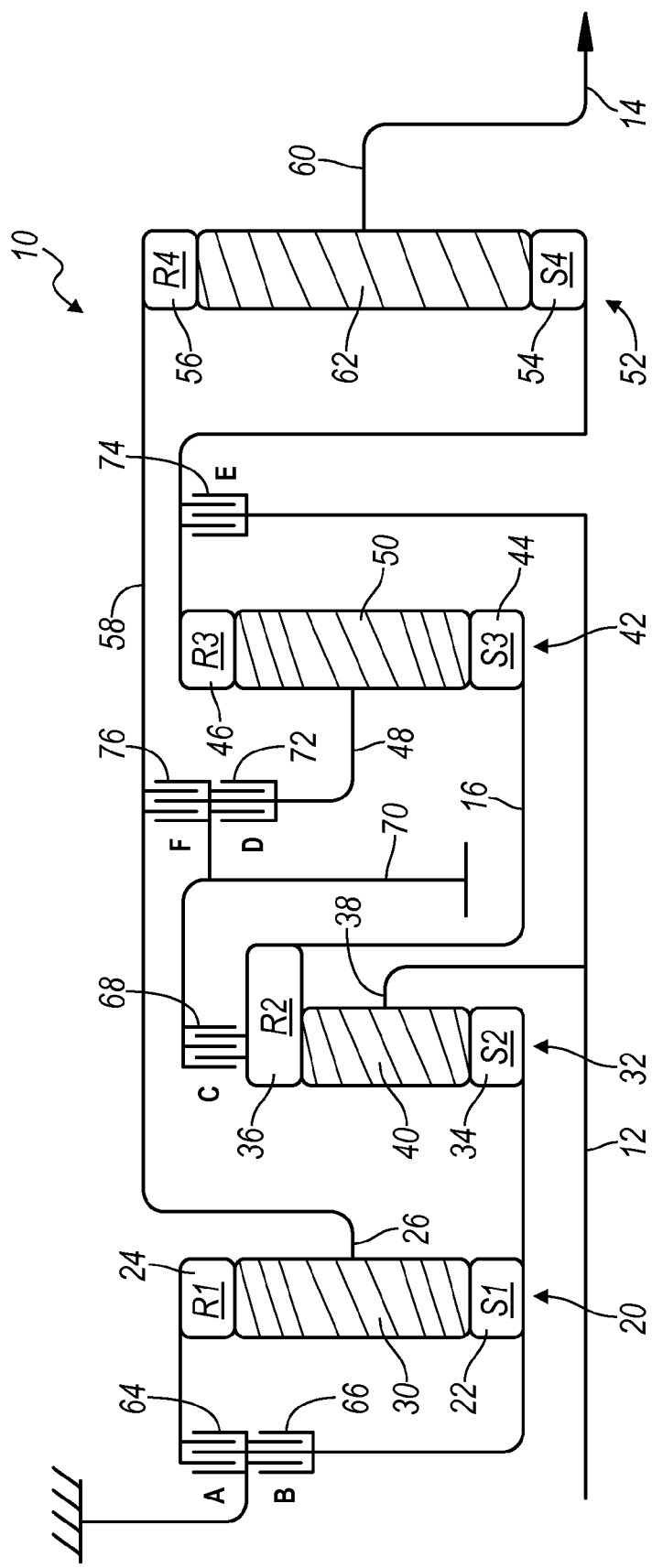
FIG. 1 is a schematic diagram of the kinematic assembly of an automatic transmission for a motor vehicle.

The assembly 10 FIG. 1 includes an input 12; output 14; intermediate shaft 16; a first planetary gear set 20 having a first sun gear 22, a first ring gear 24, a first carrier 26; and a set of planet pinions 30 supported on carrier 26 and in continuous meshing engagement with the sun gear 22 and the ring gear 24.

A second planetary gear set 32 includes a second sun gear 34 fixedly coupled to sun gear 22; a second ring gear 36; a second carrier 38 fixedly coupled to the input 12; and a set of planet pinions 40 in supported on carrier 38 and in continuous meshing engagement with sun gear 34 and ring gear 36.

A third planetary gear set 42 includes a third sun gear 44 fixedly coupled to ring gear 36; a third ring gear 46; a third carrier 48; and a set of planet pinions 50 supported on carrier 48 and in continuous meshing engagement with sun gear 44 and ring gear 46.

A fourth planetary gear set 52 includes a fourth sun gear 54 fixedly coupled to ring gear 46; a fourth ring gear 56 fixedly coupled by a shell 58 to carrier 26; a fourth carrier 60 fixedly coupled to output 14; and a set of planet gears 62 supported on carrier 60 and in continuous meshing engagement with sun gear 54 and ring gear 56.

A first brake 64 selectively holds ring gear 24 against rotation.

A second brake 66 selectively holds sun gears 22, 34 against rotation on the transmission case 124.

A first clutch 68 selectively couples ring gear 36 to a clutch housing 70.

A second clutch 72 selectively couples carrier 48 to clutch housing 70.

A third clutch 74 selectively couples ring gear 46 and sun gear 54 to input 12.

A fourth clutch 76 selectively couples shell 58 to clutch housing 70.

Figure 2:
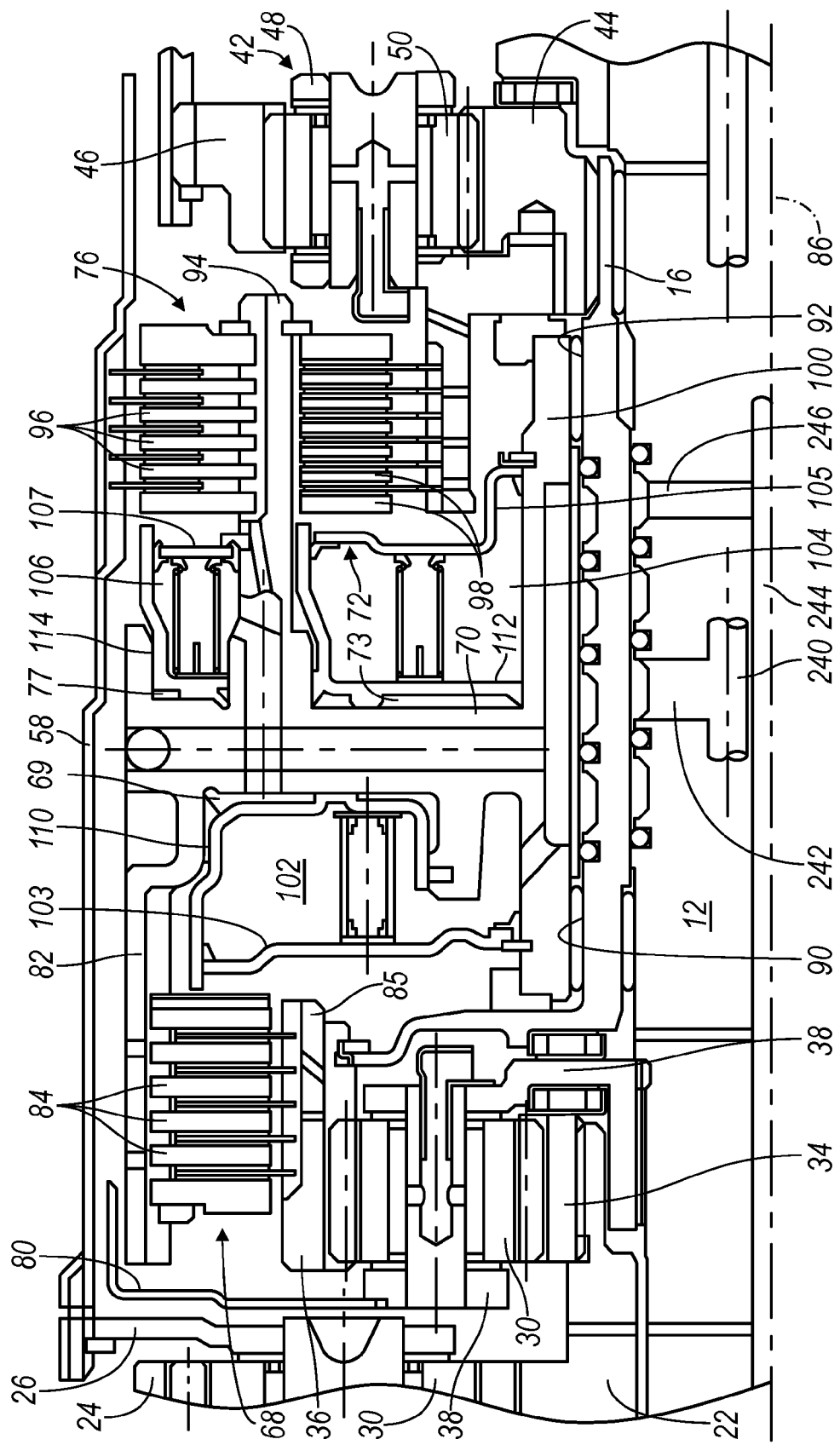
FIG. 2 is a cross sectional side view of an intermediate length portion of the kinematic assembly of FIG. 1 showing a clutch housing.

FIG. 2 shows that carrier 26 is secured to shell 58.

Clutch housing 70 includes an axial arm 82 formed with internal spine teeth, to which external teeth on the spacer plates 84 of clutch 68 are fixed for rotation with clutch housing 70. The friction plates of clutch 68 are splined to external spline teeth formed on a ring 85, which is formed with ring gear 36.

Intermediate shaft 16, which extends along axis 86 on the radial outer side of input 12, is secured to ring 85 where a snap ring 88 completes the connection. Clutch housing 70 is supported by axially spaced bushings 90, 92 on the radial outer surface of intermediate shaft 16.

Clutch housing 70 includes another axial arm 94 formed with external spine teeth, to which internal teeth on the spacer plates 96 of clutch 76 are fixed for rotation with clutch housing 70. The friction plates of clutch 76 are splined to internal spline teeth formed on a shell 58.

External teeth 98 on the spacer plates of clutch 72 engage internal spline teeth formed on arm 94 of the clutch housing 70. The friction plates of clutch 72 are splined to external spline teeth formed on carrier 48.

Located between bushings 90, 92 and formed in the hub 100 of clutch housing 70 are four feed circuits. A single balance oil feed supplies automatic transmission fluid (ATF)

to the pressure balance volumes 102, 104, 106 of clutches 68, 72, 76. Balance dams 103, 105, 107 seal the pressure balance volumes 102, 104, 106 at the pistons 110, 112, 114 of the clutches 68, 72, 76.

Each of the servo cylinders 69, 73, 77 of clutches 68, 72, 76 is supplied with actuating pressure through individual circuits formed in the clutch housing 70. When no actuating pressure is applied to clutches 68, 72, 76, the clutch housing 70 has no fixed connection to any other component of assembly 10.

Figure 3:
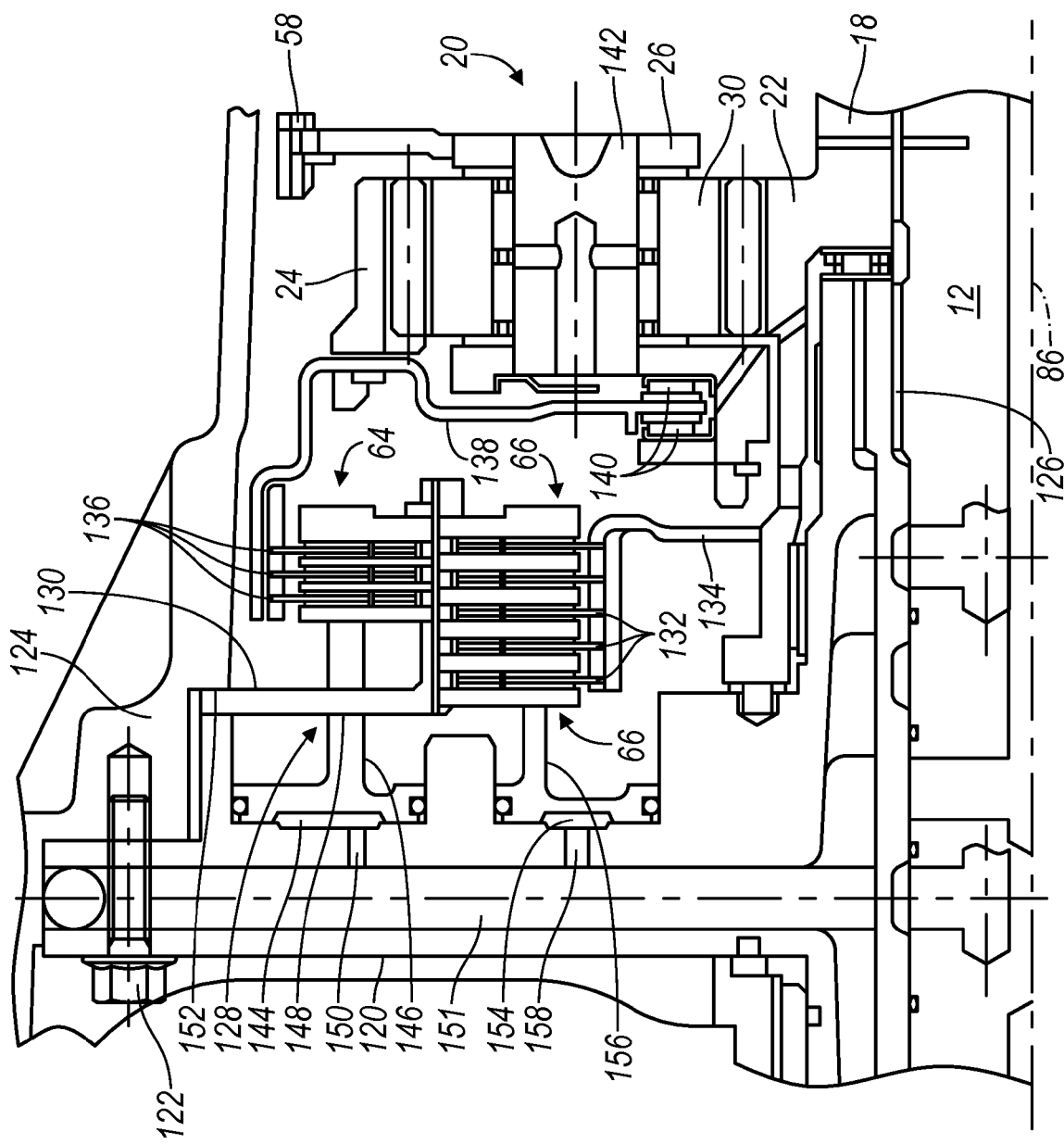
FIG. 3 is a cross sectional side view of a front length portion of the kinematic assembly of FIG. 1 showing a brake assembly.

FIG. 3 shows a pump support 120 secured by bolts 122 to the transmission case 124 and supporting the input shaft 12 on a bushing 126. A hub 128 for brakes 64, 66 includes a radial arm 130, secured to the pump support, and an axial arm formed with external and internal axial splines, to which the spacer plates of the brake and clutch are secured, respectively.

The friction discs 132 of brake 66 are connected to external, axial spline teeth formed on a disc 134, which is secured to the sun gears 22, 34 through intermediate shaft 18. The friction discs 136 of brake 64 are connected to internal, axial spline teeth formed on a disc 138, which is secured to ring gear 24 and is supported between two thrust bearings 140 located on the carrier 26.

The planet pinions 30 of gearset 20 are supported for rotation on a pinion shaft 142, which is supported on carrier 26.

Pump support 120 is formed with a first cylinder 144 containing a piston 146, which extends though openings 148 into contact with one of the spacer plates of brake 64. Brake-apply pressure is carried through passages 150, 151 to cylinder 144. The openings 148 in hub radial arm 130 allow an assembler of the brake hub assembly to see though the arm while aligning friction plates 136 with disc 138.

Pump support 120 is also formed with a second cylinder 154 containing a piston 156, which contacts one of the spacer plates of brake 66. Brake-apply pressure is carried through passage 158 to second cylinder 154.

The radial arm 130 of the brake hub 128 is secured to the transmission case 124 such that the arm contacts an axial stop 152, which limits axial displacement of the arm and provides an axial reaction force to the force of piston 146 applied to the plates of brake 64 and the force of piston 156 applied to the plates of brake 66.

Figure 4:
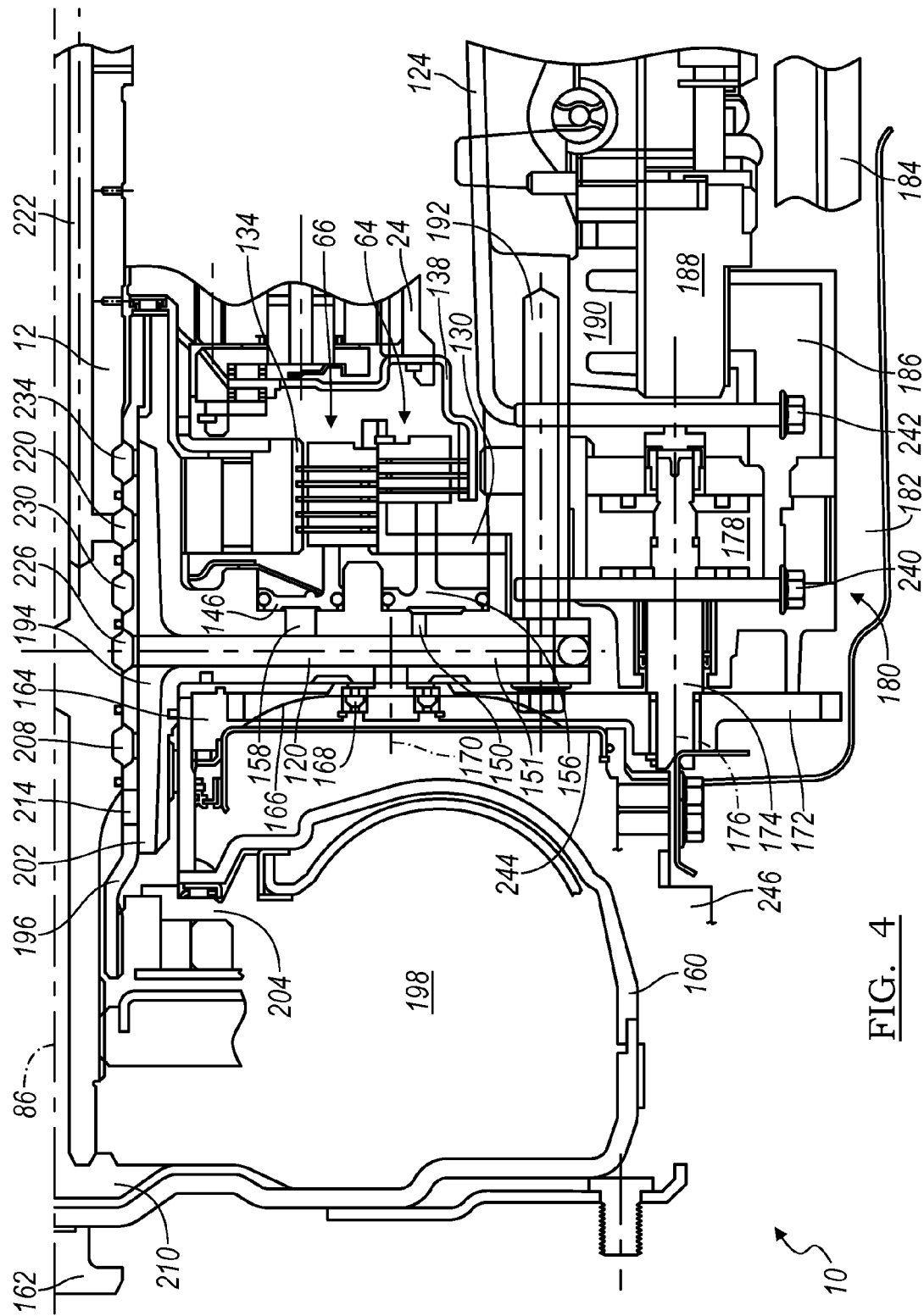
FIG. 4 is a cross sectional side view of a length portion of the kinematic assembly of FIG. 1 showing hydraulic passages.

FIG. 4 shows a torque converter 198 enclosed by an impeller housing 160, 162, which is driveably connected to an engine shaft or other power source. A drive 164 is driveably connected to impeller housing 160. An idler gear 166, supported on a bearing 168 and meshing with the drive gear, is driven by impeller housing 160 in rotation about axis 170. A gear 172, meshing with idler gear 166, is connected by a spline to a rotor shaft 174, which rotates about axis 176.

The rotor 178 of a variable displacement pump 180, secured to the rotor shaft 174, draws automatic transmission fluid (ATF) into the pump's inlet from an oil sump 182, through a filter 184 located in the sump. ATF exiting the outlet of pump 180 flows sequentially through passage 186, a hydraulic control body 188, a series of oil feed paths 190 and a series of drilled oil feed holes 192. The oil feed holes 192 are formed in transmission case 124.

The pump support 120 is formed with drilled oil feed paths directed toward axis 86 in the pump support 120. Each oil feed path connects one of the drilled oil feed holes 192 with a corresponding oil feed channel 194. Drilled holes in a torque converter stator shaft 196 connect each of the channels 194 to input shaft 12 and to the torque converter 198 located within housing 160.

Figure 5:
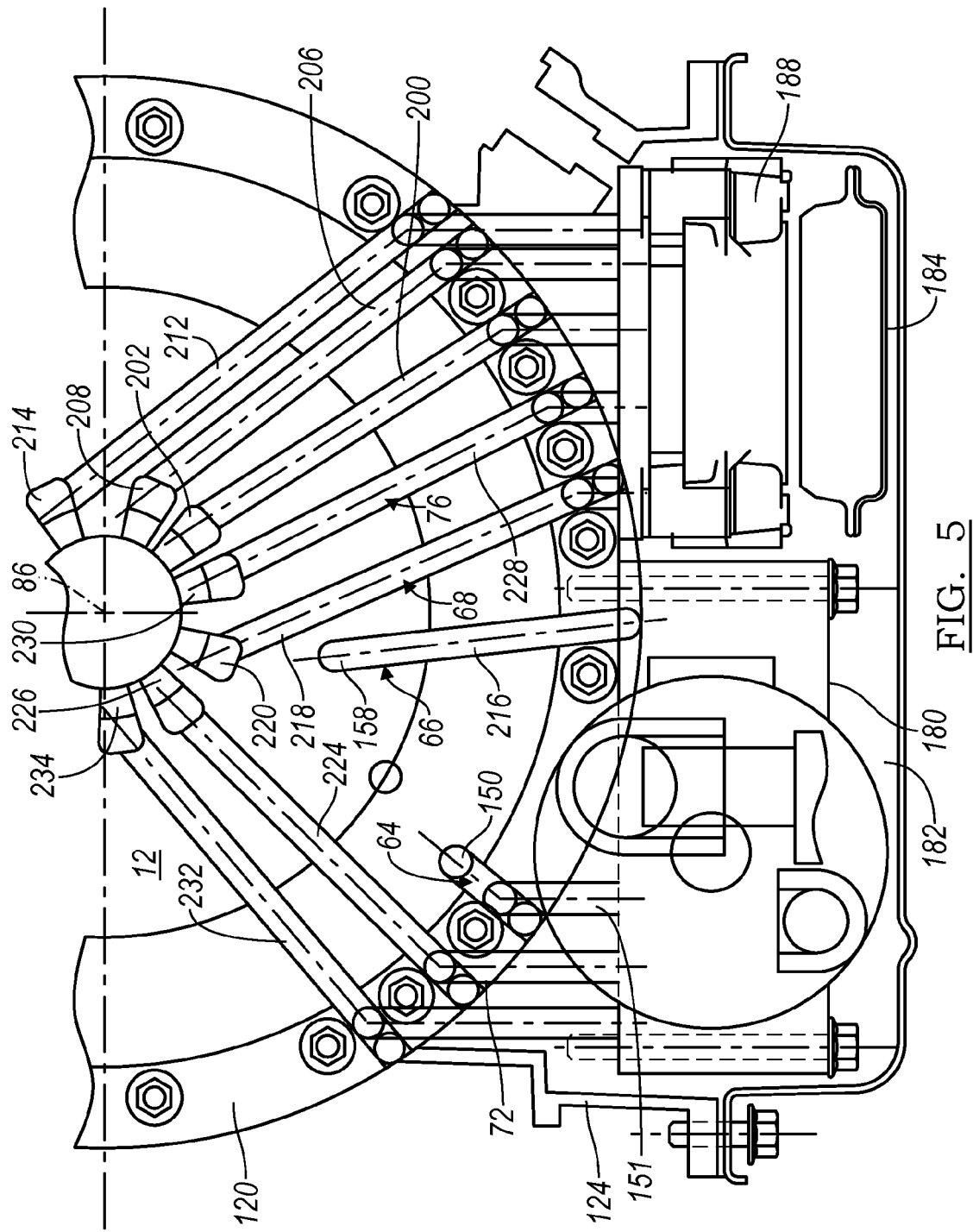
FIG. 5 is a cross sectional end view in the pump support showing hydraulic passages.

Referring now to FIGS. 4 and 5, one of the oil feed holes 192 is connected by feed path 200 in pump support 120 to a feed channel 202, through which the torque converter 198 is charged with ATF through passage 204.

Another one of the oil feed holes 192 is connected by feed path 206 in pump support 120 to a feed channel 208, through which a torque converter lockup clutch is actuated through passage 210.

One of the oil feed holes 192 is connected by feed path 212 in pump support 120 to a feed channel 214, through which the torque converter 198 is released.

FIG. 5 shows the feed path 151 and passage 150, through which brake 64 is actuated.

One of the oil feed holes 192 is connected by feed path 216 in pump support 120 to passage 158, through which brake 66 is actuated.

One of the oil feed holes 192 is connected by feed path 218 in pump support 120 to a feed channel 220, connected though an axial passage 222 in input shaft 12, through which clutch 68 is actuated.

One of the oil feed holes 192 is connected by feed path 224 in pump support 120 to a feed channel 226, connected though an axial passage in input shaft 12, through which clutch 72 is actuated.

One of the oil feed holes 192 is connected by feed path 228 in pump support 120 to a feed channel 230, connected though an axial passage in input shaft 12, through which clutch 74 is actuated.

Figure 6:
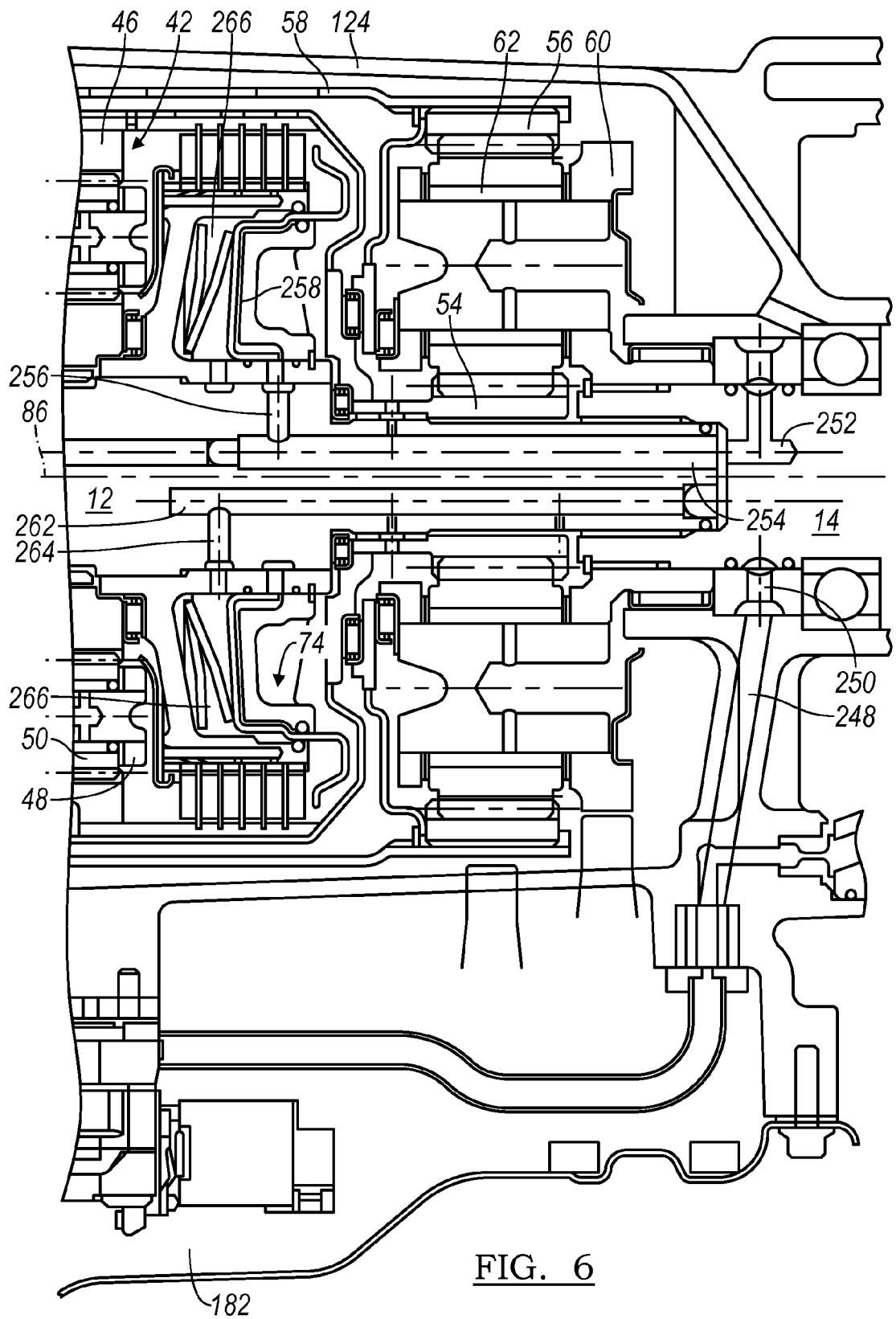
FIG. 6 is a cross sectional side view of a length portion of the kinematic assembly of FIG. 1 showing hydraulic passages that supply the rear clutch.

One of oil feed holes 192 is connected by feed path 232 in pump support 120 to a feed channel 234, connected though an axial passage in input shaft 12, through which a lube circuit is supplied. The lube circuit carries ATF to the balance volumes of clutches 68, 72, 74, 76 through axial passage 262, as shown in FIG. 6.

Each of the four axial passages in input shaft 12, through which clutches 68, 72, 74 are actuated and the lube circuit is supplied, is mutually parallel and parallel to axis 86.

Three of the axial passages in input shaft 12 communicate through clutch housing 70 to the servo cylinders of clutches 68, 72, 74 through oil feed paths in the clutch housing similar to those described with reference to the pump support 120 of FIGS. 4, 5. The axial lube passage in input shaft 12 also communicates through clutch housing 70 to the balance volumes 102, 104,106 of clutches 68, 72, 74 through oil feed paths in the clutch housing 70 similar to those described with reference to the pump support 120.

FIG. 2 shows the axial 240 and radial 242 passages, through which clutch-apply pressure is supplied to clutch 72, and the axial 244 and radial 246 passages, through which lube is supplied to the balance volumes 102, 104, 106 of clutches 68, 72, 76, respectively.

FIG. 6 is a cross sectional side view of a rearward portion of the kinematic assembly of FIG. 1 showing hydraulic passages that supply lube and clutch-apply pressure to clutch 74. A passage 248 carries fluid from the control body 188, through the oil sump 182 and transmission case 124, to a radial passage 250 formed in the output shaft 14. Aligned and connected axial passages 252, 254 in output shaft 14 and input shaft 12, respectively, hydraulically connect passage 250 and radial passage 256, which carries clutch-apply pressure to the cylinder 258 of the servo that actuates clutch 74.

The same lube passage 262 in input shaft 12 that carries lube to clutches 68, 72, 76 also carries ATF lube to clutch 74 from source of lube in control body 188. Axial passage 262 in input shaft 12 is hydraulically connected to a radial passage 264, which carries lube to the balance volume 266 of clutch 74.

In accordance with the provisions of the patent statutes, the preferred embodiment has been described. However, it should be noted that the alternate embodiments can be practiced otherwise than as specifically illustrated and described.

The invention claimed is:

1. A system for supplying fluid to transmission control elements, comprising:
   a body producing clutch-apply pressures and a lube source;
   clutches, each clutch including a servo and a balance volume;
   a shaft including passages;
   a support including paths communicating each of the clutch-apply pressures and the lube source to a respective passage;
   a clutch hub communicating clutch-apply pressure from each of the passages to a respective servo, and communicating the lube source to the balance volumes;
   a torque converter including a lock-up clutch passage; and
   wherein the body produces lock-up clutch pressure, and the support paths include a path that communicates lock-up clutch pressure to the lock-up clutch passage.

2. The system of claim 1, wherein:
   the body produces a clutch-apply pressure for each of three of the clutches;
   the shaft passages include four passages, each of first, second and third of the passages communicating clutch-apply pressure to one of the clutch servos, and a fourth passage communicating the lube source to the balance volumes.

3. The system of claim 1, further comprising:
   brakes, each brake including a brake servo; and
   wherein the body produces brake-apply pressures, and the support includes second paths that communicate each of the brake-apply pressures to a respective brake servo.

4. The system of claim 1, further comprising:
   a brake including a brake servo; and
   wherein the body produces brake-apply pressure, and the support includes a path that communicates the brake-apply pressure to the brake servo.

5. The system of claim 1, further comprising:
   the torque converter including a converter charge passage; and
   wherein the body produces converter charge pressure, and the support paths include another path that communicates converter charge pressure to the converter charge passage.

6. The system of claim 1, further comprising:
   the torque converter including a converter release passage; and
   wherein the body produces converter release pressure, and the support paths include another path that communicates converter release pressure to the converter release passage.

7. A system for supplying fluid to transmission control elements, comprising:
   a body including a lube source and producing clutch-apply pressures for each of three clutches, each clutch including a respective servo and a balance volume;
   an input shaft including four passages, each of first, second and third of the passages communicating clutch-apply pressure to one of the clutch servos, and a fourth passage communicating the lube source to the balance volumes of the clutches;
   a fourth clutch including a fourth servo and a fourth balance volume;
   an output shaft including a fourth clutch-apply passage, the output shaft including a fifth passage that communicates the fourth clutch-apply passage to the fourth servo, the fourth passage communicating the lube source to the fourth balance volume;
   a hydraulic path communicating clutch-apply pressure from the body to the fourth clutch-apply passage.

8. The system of claim 7, further comprising:
   brakes, each brake including a brake servo;
   the body produces brake-apply pressures; and
   a support that includes paths that communicate each of the brake-apply pressures to a respective brake servo.

9. The system of claim 7, further comprising:
   a brake including a brake servo;
   the body produces brake-apply pressure; and
   a support includes a path that communicates the brake-apply pressure to the brake servo.

10. The system of claim 7, further comprising:
    a torque converter including a converter charge passage; and
    the body produces converter charge pressure; and
    a support that includes a path that communicates converter charge pressure to the converter charge passage.

11. The system of claim 7, further comprising:
    a torque converter including a lock-up clutch passage;
    the body produces lock-up clutch pressure; and
    a support that includes a path that communicates lock-up clutch pressure to the lock-up clutch passage.

12. The system of claim 7, further comprising:
    a torque converter including a converter release passage;
    wherein the body produces converter release pressure; and
    a support that includes a path that communicates converter release pressure to the converter release passage.

13. A system for supplying fluid to transmission elements, comprising:
    a shaft including passages;
    a lube source;
    a support including fluid paths communicating clutch-apply pressures and the lube source to a respective passage;
    a clutch hub containing clutches, each clutch including a servo and a balance volume spaced axially from the support, the clutch hub communicating clutch-apply pressure from each of the passages to a respective servo, and communicating the lube source to the balance volumes;
    a torque converter including a lock-up clutch passage; and
    wherein a control body produces lock-up clutch pressure, and the support paths include a path that communicates lock-up clutch pressure to the lock-up clutch passage.

14. The system of claim 13, wherein:
    the control body produces a clutch-apply pressure for each of three of the clutches;
    the shaft passages include four passages, each of first, second and third passages communicating clutch-apply pressure to one of the clutch servos, and a fourth passage communicating the lube source to the balance volumes.

15. The system of claim 13, further comprising:
    the control body producing brake-apply pressures;
    brakes, each brake including a brake servo; and
    wherein the support includes second paths that communicate each of the brake-apply pressures to a respective brake servo.

16. The system of claim 13 further comprising:
    the control body producing a brake-apply pressure;
    a brake including a brake servo; and
    wherein the support includes a path that communicates the brake-apply pressure to the brake servo.

17. The system of claim 13, further comprising:
the torque converter including a converter charge passage; and
wherein the control body produces converter charge pressure, and the support paths include a path that communicates converter charge pressure to the converter charge passage.

18. A system for supplying fluid to transmission control elements, comprising:
a body producing clutch-apply pressures and a lube source;
clutches, each clutch including a servo and a balance volume;
a shaft including passages;
a support including paths communicating each of the clutch-apply pressures and the lube source to a respective passage;
a clutch hub communicating clutch-apply pressure from each of the passages to a respective servo, and communicating the lube source to the balance volumes;
a torque converter including a converter release passage; and
wherein the body produces converter release pressure, and the support paths include a path that communicates converter release pressure to the converter release passage.

* * * * *